United States Patent Office 3,471,781
Patented Oct. 7, 1969

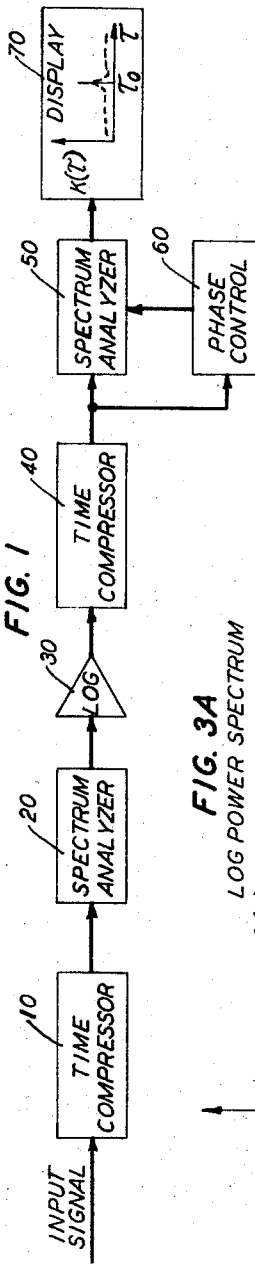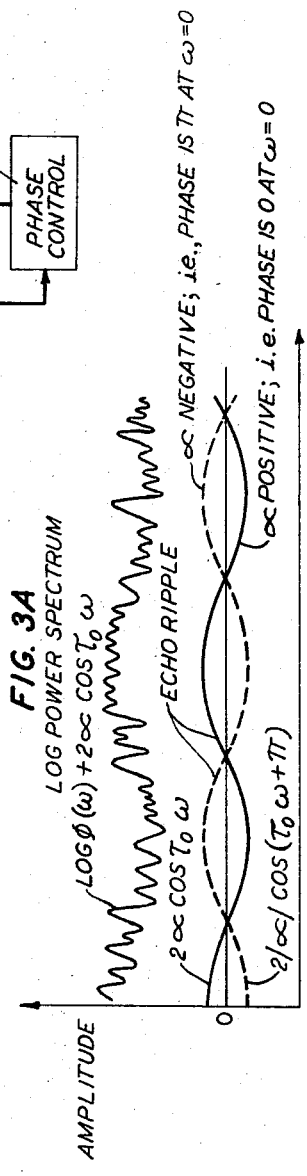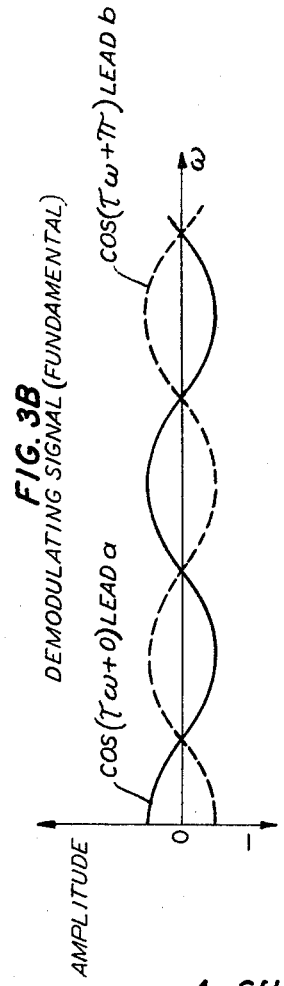

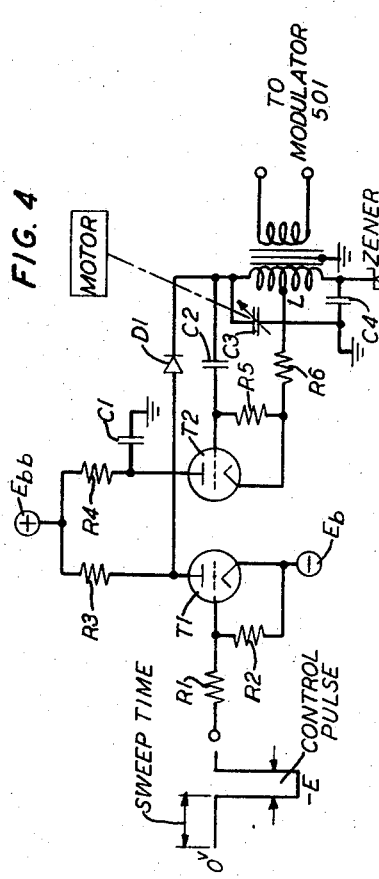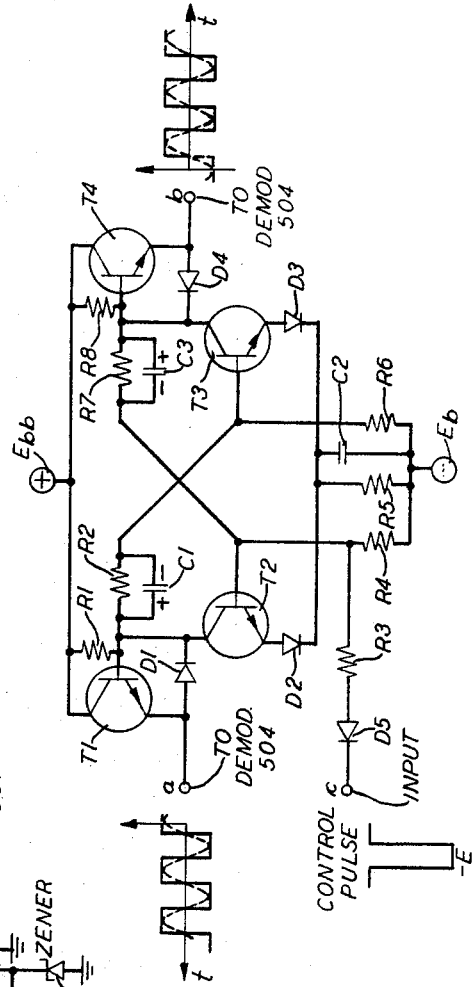

3,471,781
APPARATUS FOR DETECTING THE ECHOES OF TRANSMITTED SIGNALS
Arthur Shapiro, West Orange, and Jerome J. Zuvich, Parsippany, N.J., assignors to Bell Telephone Laboratories, Incorporated, Murray Hill and Berkeley Heights, N.J., a corporation of New York
Filed May 25, 1966, Ser. No. 552,792
Int. Cl. C01r 23/16, 27/02
U.S. Cl. 324—77     11 Claims

ABSTRACT OF THE DISCLOSURE

An arrangement for detecting the echo of a transmitted signal is disclosed. The arrangement increases the effectiveness of echo detection systems by utilizing information concerning the phase of the echo signal in order to obtain the short-time spectrum of the logarithm of the short-time power spectrum, or cepstrum, of the received signal.

---

This invention relates to signal processing and in particular to an arrangement whereby the probability of detecting an echo at a given signal-to-noise ratio is increased, or equivalently, whereby the minimum signal level at which an echo can be detected, in the presence of noise, is decreased. It is an object of this invention to improve the effectiveness of detecting a signal of the form $x(t)+\alpha x(t-\tau_0)$.

In many situations, for example, seismology, geology, acoustics and related sciences, it is often necessary to detect a transmitted signal $x(t)$ and its echo $\alpha x(t-\tau_0)$ in the presence of noise and other interference. It is well known that when $\alpha$, the echo attenuation factor, is small, as in the usual case of interest, the logarithm of the power spectrum of the signal and its echo contains the term $2\alpha \cos \tau_0 \omega$ with a "repetition rate" $\tau_0$ equal to the delay of the echo relative to the transmitted signal. This term, which has the value of a cosine wave, is referred to as a "cosinusoidal ripple." The word "cosinusoidal," by a direct analogy with the word "sinusoidal," is used in this specification to mean "having a magnitude that varies as the cosine of an independent variable." Thus, one technique for detecting the presence of a transmitted signal and its echo is to detect the cosinusoidal ripple on the power spectrum of the received signal. Often this is done by calculating the "short-time spectrum of the logarithm of the short-time power spectrum of the received signal," called for short, the "cepstrum," (an anagram of "spectrum") of the received signal. To obtain the cepstrum, the logarithm of the short-time power spectrum is usually converted into a time-dependent waveform, with frequency in the original power spectrum proportional to time. This time-dependent waveform is weighted as a function of time, and its Fourier transform, namely the cepstrum, is obtained by conventional methods. The resulting cepstrum is defined in terms of time, rather than frequency as in the case of a spectrum. If the cosinusoidal ripple is present in the time-dependent waveform, the cepstrum exhibits a distinct maximum at a time $\tau_0$ corresponding to the echo delay. The presence of multiple echoes with different delay times in the received signal is indicated by a corresponding number of distinct maximums in the cepstrum.

The phase at zero frequency of the cosinusoidal echo ripple, hereafter called the "initial ripple phase," is either zero or approximately 180 degrees depending on whether $\alpha$ is positive or negative. Since the sign of $\alpha$ is a function of the reflection process, the initial phase of the expected ripple is known whenever the reflection process is known, even though the expected ripple has not been detected. The cepstrum techniques, however, makes no use of this phase information in detecting the presence of the ripple.

This invention, on the other hand, increases the effectiveness of echo detection systems by utilizing the initial ripple phase, whenever it is known, to aid in detecting the presence of the ripple on the logarithm of the power spectrum of a received signal. It has been discovered that by utilizing this phase information, the effectiveness of detecting an echo, in terms of signal to noise ratio, can be improved by up to about 1 to 1½ decibels.

In one embodiment of this invention, the waveform representing the logarithm of the short-time power spectrum of the received signal is repeatedly modulated with a cosinusoidal modulating signal controlled to oscillate at a different average frequency during each modulation. A selected modulation product is demodulated and integrated during each modulation. In accordance with this invention, the phase of a cosinusoidal demodulating signal is set, at the beginning of each modulation, to match the expected initial ripple phase of the expected cosinusoidal ripple on the logarithm of the power spectrum. When the ripple is present and when the average frequency of the cosinusoidal modulating signal is proportional to the repetition rate $\tau_0$ of the ripple, the integral of the demodulated modulation product reaches a sharp maximum indicating the receipt of an echo. The matching of the initial phase of the cosinusoidal demodulating signal to the expected initial ripple phase increases the probability of detecting the echo.

This invention may be fully understood from the following detailed description of illustrative embodiments thereof taken in connection with the appended drawings in which:

FIG. 1 is a schematic block diagram of an echo detection system utilizing the principles of this invention;

FIGS. 3A and 3B are graphs showing the relationship required by this invention between the initial ripple phase of the cosinusoidal echo ripple on the logarithm of the short-time power spectrum of the received signal and the initial phase of the cosinusoidal demodulating signal;

FIG. 4 is a circuit diagram of one embodiment of sweep oscillator 502 shown in FIG. 2;

FIG. 5 is a circuit diagram of one embodiment of demodulating oscillator 505 shown in FIG. 2.

Figure 2:
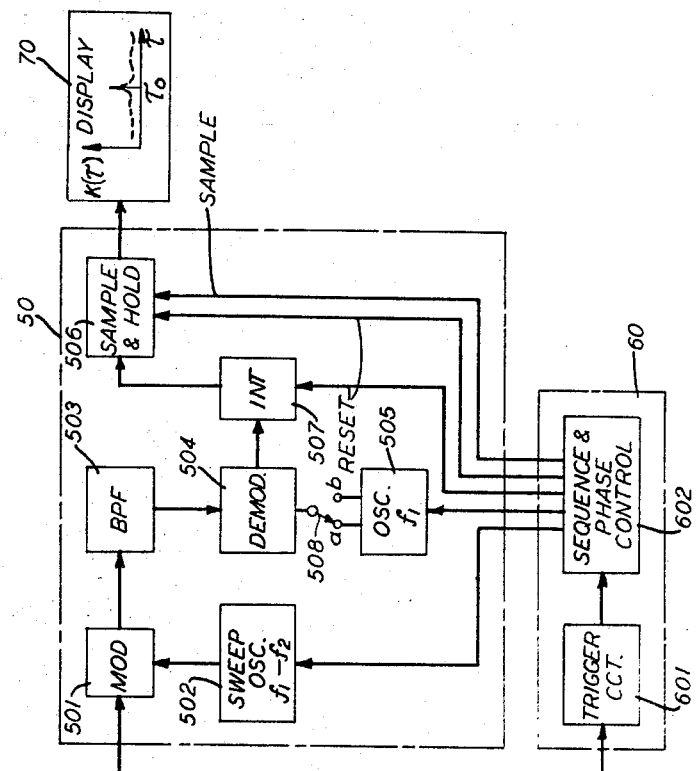
FIG. 2 is a block diagram of suitable spectrum analyzer apparatus 50 and phase control apparatus 60 shown in FIG. 1.

One embodiment of this invention is shown in FIG. 1. In this embodiment, selected time segments of a received signal developed by a transducer placed in a transmission medium are sequentially compressed in time and stored in time compressor 10. Each stored, time-compressed segment usually contains noise and interference and sometimes contains a transmited signal and its echo generated, for example, by a sesimic disturbance or an explosion. In order to detect the presence of a transmitted signal and its echo, each time-compressed segment of the received signal is operated upon by spectrum analyzer 20 to yield a waveform which varies in amplitude as a function of time and which represents the so-called "short-time power spectrum" of the corresponding segment of the received signal. The adjective "short-time" is used to emphasize that the power spectrum is calculated from a signal segment of finite, rather than infinite, duration. The waveform from analyzer 20 is converted by logarithmic amplifier 30 into a signal proportional to the logarithm of the short-time power spectrum of the received signal. This logarithmic signal is in turn compressed in time and stored in compressor 40 for a selected interval until replaced by a new logarithmic signal representing the short-time power spectrum derived from the next following time-segment of the received signal. The operation of compressor 10, analyzer 20, amplifier 30, and compressor 40 is described in detail in copending application Ser. No. 420,362, filed Dec. 22, 1964 by A. M. Noll and M. R. Schroeder, and thus will not be described here in further detail.

Spectrum analyzer 50 operates upon the time-compressed logarithmic signal supplied from compressor 40 to derive what is called the "pseudo-autocovariance" of the received signal. The pseudo-autocovariance function $K(\tau)$ is defined as $$K(\tau) = 1/\omega_0 \int_0^{\omega_0} \log S(\omega) \cos \tau\omega d\omega \qquad (1)$$

where $\omega$ is frequency, $S(\omega)$ is the short-time power spectrum of the received signal, $\omega_0$ is the maximum significant frequency component in the received signal, and $\tau$ is a new variable with units of, for example, radians per radian per second, or time. The term $\tau$ when used in the manner indicated by Equation 1, is often called "quefrency," as anagram of frequency, to emphasize the similarity between $\tau$ in the operation indicated by Equation 1 and frequency in the transformation to the frequency domain of a time-dependent signal by means of the Fourier transform.

An examination of Equation 1 shows that if frequency $\omega$ is considered analogous to time $t$ and delay $\tau$ analogous to frequency, the pseudo-autocovariance function is the cosine transform of the waveform representing the logarithm of the short-time power spectrum of the received signal. The cosine transform of this waveform is obtained in analyzer 50 by first repeatedly modulating the waveform with a cosinusoidal modulating signal controlled to oscillate at a different average frequency during each modulation. The oscillatory frequencies of this modulating signal are chosen to be proportional to selected delay times $\tau$ from within the range of possible delay times of the expected echo or echos. In effect, this first modulation shifts the waveform representing the logarithm of the power spectrum into a new higher frequency band where further operations can be more easily carried out. During each modulation the modulation product at a selected frequency is demodulated and integrated with respect to time. The amplitude of the signal resulting from this integration at the end of each modulation is proportional to the value of the pseudo-autocovariance of the received signal at the delay time corresponding to the frequency of the modulating signal. This amplitude is displayed by display apparatus 70. When the logarithm of the short-time power spectrum contains the cosinusoidal echo ripple and when the frequency of the cosinusoidal modulating signal is proportional to the delay time of the echo $\tau_0$, the pseudo-autocovariance function $K(\tau_0)$ reaches a distinct maximum indicating the receipt of an echo.

In accordance with this invention, the phase of the cosinusoidal demodulating signal at the beginning of each modulation is set by phase control 60 to match the expected initial ripple phase of the cosinusoidal echo ripple on the logarithm of the short-time power spectrum. As a result, echos can be detected which possess signal-to-noise ratios up to 1 to 1½ decibels lower than the previous minimum signal-to-noise ratio.

FIG. 2 shows one embodiment of spectrum analyzer 50 and phase control 60 in more detail. The time compressed waveform representing the logarithm of the short-time power spectrum of one portion of the received signal is continuously and repetitively read out of compressor 40. While this waveform is a function of time, the short-time power spectrum is of course a function of frequency. Thus, time is directly proportional to and represents frequency in the operations of analyzer 50. Time can be thought of as a dummy variable introduced only because the operation of obtaining the spectrum of a power spectrum is conveniently carried out in real time by substituting time for frequency in the functional expression for the power spectrum.

The waveform stored in compressor 40 is preceded by a marker pulse generated in a well-known manner by spectrum analyzer 20 and transferred with the short-time power spectrum to compressor 40. This marker pulse activates a trigger circuit 601 in phase control 60. Circuit 601 is, in one embodiment, a monostable multivibrator which reshapes and amplifies the marker pulse. The pulse from circuit 601 activates sequence and phase control 602 which in turn controls the operation of analyzer 50. In particular, control 602 sets the phases of the signals from sweep oscillator 502 and demodulating oscillator 505, and resets integrator 507 and sample and hold circuit 506. Control 602, in one embodiment, consists of a series of monostable multivibrators each of which emits a control pulse in proper time sequence to control a corresponding element of analyzer 50.

The waveform from compressor 40 is modulated in analyzer 50 by a cosinusoidal modulating signal generated in sweep oscillator 502. Oscillator 502 generates a signal which varies from a selected frequency $f_1$ to a selected frequency $f_2$ in a time period T. For example, the frequency range $(f_2-f_1)$ might be 5 kilocycles while the time period T necessary for oscillator 502 to sweep this frequency range might be 2 seconds. The waveform stored in compressor 40 is read out repetitively at a rapid rate, for example, once every 10 milliseconds. Thus in the 2 seconds of time necessary for oscillator 502 to sweep over its entire frequency range, this waveform has been read out 200 times from compressor 40.

During each read out period of 10 milliseconds, oscillator 502 changes in frequency by about 25 cycles per second. In a typical case, one real time second of waveform contains about 20 cycles of cosinusoidal echo ripple. This waveform is compressed in time by a factor of 200 in compressor 40; therefore the ripple frequency is about 4 kilocycles per second in the time-compressed waveform. Thus, the 25 cycles per second change in the frequency of oscillator 502 during each read out period is quite small compared to the ripple frequency of the time-compressed waveform and the frequency of oscillator 502 can be considered approximately constant during each read out period.

One embodiment of oscillator 502 and its associated gating circuitry is shown in more detail in FIG. 4. Other oscillators will of course be perfectly satisfactory in implementing this invention. The oscillator shown in FIG. 4 consists of triode T2, a tank circuit containing variable capacitor C3, blocking capacitor C4 and inductor L, and a feedback path which carries the output voltage from the tank circuit to the grid of triode T2. Variable capacitor C3 is motor driven over its complete range in the time period T, equal in the earlier example, to 2 seconds. Capacitor C2 isolates the grid of triode T2 from the positive supply voltage $E_{bb}$. Grid to cathode resistor R5 is selected to be much larger than plate resistor R6, so that the grid voltage of triode T2 is effectively equal to the voltage across the tank circuit. Biasing resistor R4 is shunted by capacitor C1 to provide a low impedance path for alternating current. Inductor L in the tank circuit is merely the center-tapped primary of an output transformer. The primary is connected to ground through both capacitor C4 and Zener diode D2. Diode D2 has a breakdown voltage of, for example, 100 volts, thereby ensuring both that the direct current bias voltage at the primary is 100 volts and that the cathode bias voltage of triode T2 is above 100 volts. When gating triode T1 is "on" or conducting, oscillations are produced at a frequency determined essentially by variable capacitor C3 and inductor L.

At the beginning of each readout of the time-compressed waveform from compressor 40, a negative control pulse from control 60 is applied to the grid of normally-conducting gating triode T1, cutting off its plate current. Grid to cathode resistor R2 is much larger than input resistor R1 to ensure that the grid voltage is essentially the voltage of the marker pulse. Plate resistor R3 is selected so that the plate voltage relative to ground across gating triode T1 is normally less than the breakdown voltage of diode D2 by an amount equal to the peak negative swing of the oscillating voltage across the tank circuit. Thus diode D1 is normally reverse biased and presents a high impedance to the flow of current from the plate of triode T1 to ground. However, when the plate current in triode T1 is cut off by the negative marker pulse, the plate voltage across this triode rises to a value such that diode D1 is forward biased. Thus diode D1 in series with resistor R3 provides a low impedance path which shunts the tank circuit thereby lowering its Q below the value needed for oscillation. Effectively, when the marker pulse is applied to the grid of triode T1, the grid voltage of triode T2 is clamped by the direct current from power supply $E_{bb}$ flowing through R3, diode D1, the primary of the output transformer, and diode D2.

When the marker pulse is removed from the grid of T1, the direct current flowing through the transformer primary at that instant is the initial value of the oscillatory current to be developed in the tank circuit. By careful selection of the value of resistor R3, the direct current through the primary when triode T1 is cut off is made equal to the maximum value of the alternating current in the primary when triode T1 is conducting. Thus the oscillator starts with a maximum current in the primary and zero voltage across the tank circuit. To generate a cosinusoidal, rather than sinusoidal, modulating signal the oscillator must be turned on by control 60 approximately one-quarter cycle before the readout of the time-compressed waveform from compressor 40. Oscillator 502 is shut off and turned on 200 times in the time period T under the assumption of the earlier example.

The waveform from compressor 40 (FIG. 2) is modulated in modulator 501 by the signal from the secondary of the output transformer of oscillator 502. The output signal from modulator 501 contains numerous frequency components with the radian frequency of each component given by either the sum $(\omega_M + \omega)$ or the difference $(\omega_M - \omega)$ of the radian frequency $\omega_M$ of the modulating signal and the radian frequency $\omega$ of a corresponding component in the time-compressed waveform. Bandpass filter 503 is provided to filter out all components of this output signal except the component with the frequency $f_1 = (\omega_M - \omega)/2\pi$.

The signal at frequency $f_1$ passed by filter 503 is demodulated in demodulator 504. Oscillator 505 generates a demodulating signal with a frequency $f_1$. This demodulating signal is synchronized in phase with the phase of the output signal from filter 503 by a signal from control 60 at the beginning of each modulation.

In one embodiment, oscillator 505 is a free-running multivibrator. Such a multivibrator is shown in detail in FIG. 5. The initial phase of the demodulating signal is matched to the expected initial ripple phase by starting the multivibrator an appropriate time before the readout of the time-compressed waveform from compressor 40. The control signal is applied to input lead c and the demodulating signal, essentially a square wave, is taken from lead a. In an alternative embodiment the initial phase of the cosinusoidal demodulating signal is matched to the expected initial ripple phase by making use of the fact that the multivibrator produces two output signals 180 degrees out of phase.

Before analyzing the operation of this multivibrator, it should be noted that transistors T1 and T4 and diodes D1 and D4 prevent loading of the multivibrator and exhibit negligible voltage drops when forward biased. Thus the collector voltages of transistors T2 and T3 are the output voltages on leads a and b, respectively, of the multivibrator.

The operation of oscillator 505 is easily understood by assuming that transistor T2 has just started conducting. The collector current for transistor T2 is drawn through resistor R1 thus lowering the output voltage at lead a. Capacitor C1, which carries a negative voltage as shown relative to the output voltage on lead a, drives the base of transistor T3 negative relative to the emitter of T3. Transistor T3 stops conducting and the output voltage at lead b increases instantaneously to reflect the decrease in collector current through R8. Capacitor C3 then charges to the new, larger voltage drop across resistor R7. Simultaneously, capacitor C1 discharges to match the smaller equilibrium voltage drop across resistor R7 when transistor T2 conducts, thereby allowing the base of transistor T3 to become positive relative to its emitter. Thus, transistor T3 begins to conduct again and the increased voltage drop across resistor R8 together with the new charge on capacitor C3 forces the base of transistor T2 negative relative to its emitter cutting off T2. The collector voltage of transistor T2 instantaneously rises to reflect the smaller voltage drop through resistor R1. This process continues indefinitely unless interrupted by an external signal applied to input lead c. The output voltage at lead a is thus 180 degrees out of phase with the output voltage at lead b.

The frequency of oscillation of the multivibrator is controlled by the discharge time of capacitors C1 and C3. Smoothing capacitor C2 and resistor R5 maintain the emitter voltages of transistors T2 and T3 substantially constant while resistors R4 and R6 are selected so that the base voltage of each transistor during conduction is above the emitter voltage. Diode D5 isolates control 60 from oscillator 505.

A negative pulse, generated by control 60 and applied to the multivibrator at input lead c, is used to clamp the multivibrator for the duration of the marker pulse preceding the time-compressed waveform from compressor 40. Thus the base voltage of transistor T2 is clamped to a negative voltage and T2 is cut off for the duration of the marker pulse. Transistor T3 can be either conducting or cut off when the negative control pulse is applied because the rise in the collector voltage of transistor T2 when T2 is cut off ensures that T3 will immediately conduct and continue to conduct for the duration of the marker pulse. The duration of the marker pulse is longer than the charge time of capacitors C1 and C3. Thus, when the marker pulser is removed, the charge on capacitor C3 maintains the base of T2 negative relative to the emitter of T2 until C3 has discharged a certain percentage of its charge. By removing the marker pulse a selected time before the readout of the time-compressed waveform from compressor 40, the initial phase of the output signal on lead a can be matched to the expected initial ripple phase of the consinusoidal echo ripple on the logarithm of the short-time power spectrum of the received signal.

Alternatively, resistors R3 and R4 can be selected so that the time between the removal of the marker pulse and the turning on of T2 is one-half the time a transistor is cut off during the normal operation of the multivibrator. In this case, the output voltage from lead a is a nonlinear "square" wave which is initially positive but which swings negative after one-quarter of its fundamental period has elapsed and which remains negative for one-half its fundamental period before swinging positive again. The wave then remains positive for one-half its fundamental period before swinging negative again. The output voltage from lead b is 180 degrees out of phase with the voltage on lead a but otherwise is identical to this voltage.

Because the output voltages on leads a and b are alternating positive and negative square waves with an initial phase difference of 180 degrees, each can be represented in the frequency domain by a cosinusoidal signal at the fundamental frequency of the periodic square waves together with the odd harmonics of this fundamental signal.

FIG. 3B shows the fundamental cosinusoidal demodulating signals generated at leads $a$ (zero initial ripple phase) and $b$ (180 degrees initial ripple phase). These demodulating signals are placed, for comparison purposes, beneath the waveform representing the logarithm of the short-time power spectrum of the received signal, shown in FIG. 3A.

When the received signal contains a transmitted signal and and its echo, in addition to noise, the logarithm of the power spectrum of the received signal contains the terms $\log \varphi(\omega) + 2\alpha \cos \tau_0 \omega$ where $\varphi(\omega)$ is the power spectrum of the transmitted signal and the other terms have been previously defined. Thus FIG. 3A shows a curve representing the logarithm of the power spectrum of the received signal and in addition, shows separately, two curves representing the cosinusoidal ripple on the power spectrum caused by the presence of the echo of the transmitted signal. The two curves shown correspond to the two most probable values, $\alpha$ and $-\alpha$, of the echo attenuation factor. It can be shown mathematically, though the proof is omitted for the purpose of simplicity, that by matching the initial phase of the cosinusoidal demodulating signal to the initial ripple phase, the minimum signal-to-noise ratio at which an echo can be detected is decreased about 1 to 1½ decibels. Thus, the initial phase of the demodulating signal for use in demodulator 504 (FIG. 2) is determined by controlling the starting time of oscillator 505 with the arm of switch 508 on lead $a$. Alternatively the arm of switch 508 is set on lead $b$ when the initial ripple phase is 180 degrees, and on lead $a$ when the initial ripple phase is zero.

Demodulator 504 (FIG. 2) produces an output signal with a direct current component on which are superimposed alternating current components at frequencies equal to even integral multiples of frequency $f_1$. As shown in FIGS. 3A and 3B, the phase of the signal from demodulating oscillator 505 at zero time has been matched to the expected phase of the echo ripple at zero time. Thus when the modulated echo ripple is passed by filter 503, the amplitude of the direct current signal from demodulator 504 is directly proportional to the product of the amplitudes of the signal from oscillator 505 and the modulated echo ripple from filter 503. No significant amplitude reduction in the direct current signal attributable to an initial phase difference between the two signals occurs.

The signal from demodulator 504 is integrated in integrator 507 over the time taken to modulate once the time-compressed waveform stored in compressor 40. Integrator 507 is reset after each integration by a pulse from control 602. However, resetting is delayed by the time necessary for sample and hold circuit 506 to sample the integrated voltage of the signal in integrator 507 in response to a sampling pulse from control 602. Circuit 506 generates and holds a voltage proportional to the value of the voltage generated by integrator 507 until the circuit is reset by a pulse from control 602. The value of the voltage generated in circuit 506 is shown on display apparatus 70.

The ordinate of the display on apparatus 70 represents the amplitude of the psuedo-autocovariance function $K(\tau)$ while the abscissa represent quefrency or delay time $\tau$. Since the frequency of the cosinusoidal modulating signal from oscillator 502 is proportional to delay time, each sample of the integral in integrator 507 shown on the display corresponds to the psuedo-autocovariance of the received signal at a different echo delay time $\tau$. When the modulating frequency of the signal from oscillator 502 corresponds to the delay time $\tau_0$ of an echo, the amplitude of the psuedo-autocovariance function shown on the display of apparatus 70 is a maximum.

Integrator 507, sample and hold circuit 506, and display apparatus 70 are all of well-known design and thus will not be described in detail.

Figure 6:
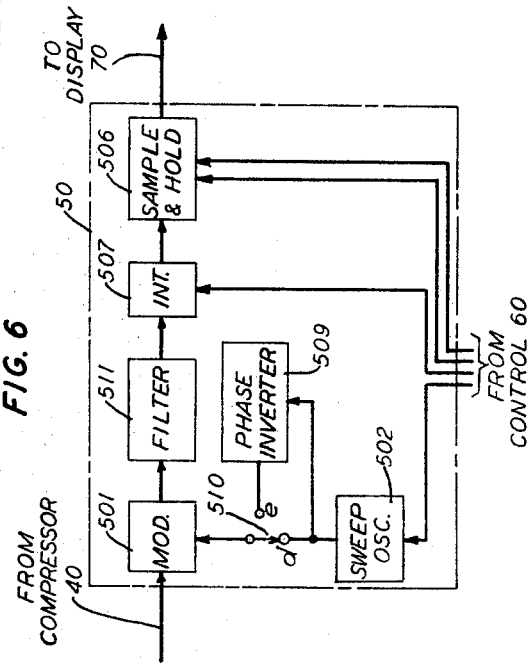
FIG. 6 is a block diagram of an alternative to spectrum analyzer apparatus 50 shown in FIG. 2.

It should be noted that alternatively, the selected modulation product can be integrated directly, rather than, as shown in FIG. 2, the demodulated modulation product. In this case, shown in FIG. 6, the initial phase of the cosinusoidal modulating signal is matched to the expected initial ripple phase by use of a phase inverter 509 between oscillator 502 and modulator 501. If the expected initial ripple phase is 180 degrees, the signal from oscillator 502 is inverted in phase by setting the arm of switch 510 on contact $e$ rather than on contact $d$ as in the case when the expected initial ripple phase is zero. Of course, in this configuration, the range of frequencies covered by sweep oscillator 502 must correspond to the expected range of ripple frequencies on the time-compressed waveform from compressor 40. Bandpass filter 503 in FIG. 2 is replaced by low pass filter 511 in FIG. 6 which passes the instantaneous direct-current modulation product from modulator 501. When the modulating frequency equals the echo ripple "frequency," $\tau_0$, the integral of the signal passed by filter 511 is a maximum. Demodulator 504 and oscillator 505 shown in FIG. 2 are not needed in this configuration.

Other embodiments incorporating the principles of this invention will be obvious to those skilled in the signal processing art. In particular, embodiments capable of increasing the echo detection probability when the echo reflection coefficient is complex will be apparent from the above disclosure.

What is claimed is:
1. Apparatus which comprises
    means for representing the logarithm of the power spectrum of a signal as a waveform which varies in amplitude as a function of time;
    means for repeatedly modulating said waveform with a cosinusoidal modulating signal;
    means for generating a cosinusoidal demodulating signal;
    means for setting the phase of said cosinusoidal demodulating signal to a specified value at selected times; and
    means for continuously demodulating a selected modulation product generated by said modulating means with said demodulating signal.
2. Apparatus as in claim 1 in which said representing means comprise
    means for generating the power spectrum of a selected time segment of a received signal;
    means for generating from said power spectrum a waveform proportional to the logarithm of said power spectrum;
    means for storing a time-compressed version of said waveform; and
    means for continuously and repeatedly reading out from said storing means said time-compressed waveform.
3. Apparatus as in claim 1 in which said modulating means comprise
    means for continuously generating a cosinusoidal modulating signal;
    means for continuously varying the frequency of said cosinuosoidal modulating signal;
    means for repeatedly modulating said waveform with said continuously varying cosinusoidal modulating signal; and
    means for setting the phase of said cosinusoidal modulating signal to specified values at selected times.
4. Apparatus as in claim 1 in which said generating means and said phase setting means comprise
    means for generating two demodulating signals at a selected frequency, one of said signals being 180 degrees out of phase with the other of said signals;
    means for setting the phases of said demodulating signals to specified values at selected times; and
    means for selecting one of said two demodulating signals for use in said demodulating means.
5. Apparatus as in claim 4 in which said generating means comprise a free-running multivibrator, capable of producing two output signals 180 degrees out of phase.

6. Apparatus as in claim 4 in which said phase setting means comprise means for clamping said demodulating signals to specified values for a selected time.

7. Apparatus which comprises means for representing the logarithm of the power spectrum of a signal as a function of time;

means for repeatedly modulating said function of time with a variable-frequency cosinusoidal modulating signals;

means for controlling the frequency of said modulating signals during each modulation;

means for setting the phase of said modulating signal to a first specified value at selected times;

means for generating two constant frequency cosinusoidal demodulating signals;

means for demodulating a selected modulation product generated by said modulating means with a selected one of said two demodulating signals; and means for setting the phase of said selected demodulation signal to a second specified value at selected times.

8. In combination, means for representing the logarithm of the power spectrum of a signal as a function of time;

means for generating a cosinusoidal modulating signal;

means for modulating said function of time with said modulating signal;

means for setting the phase of said modulating signal to a first selected value of the start of said modulation;

means for generating a constant frequency demodulating signal;

means for setting the phase of said demodulating signal at the start of said modulation to match the expected phase at zero frequency of a cosinusoidal ripple on the logarithm of said power spectrum;

means utilizing said demodulating signal for demodulating a selected modulation product from said modulating means;

means for integrating said demodulated modulation product over the duration of said modulation;

means for sampling the integral resulting from said integration at the end of said modulation to produce a sample with an amplitude proportional to the pseudo-autocovariance function of said signal at a delay time corresponding to the frequency of said modulating signal; and means for holding and displaying the value of said sample for a selected time.

9. Apparatus which comprises means for representing the logarithm of the power spectrum of a signal as a function of time;

means for modulating said function of time with a cosinusoidal modulating signal; and means for setting the phase of said modulating signal to a selected value at the start of said modulation.

10. Apparatus as in claim 9 in which said phase setting means comprise means for setting the phase of said cosinusoidal modulating signal at the start of said modulation to match the expected phase of an expected cosinusoidal ripple on the logarithm of said power spectrum at zero frequency.

11. In combination, means for representing the logarithm of the power spectrum of a signal as a function of time;

means for generating a cosinusoidal modulating signal;

means for modulating said function of time with said modulating signal;

means for setting the phase of said modulating signal at the start of said modulation to match the expected phase at zero frequency of a cosinusoidal ripple on the logarithm of said power spectrum;

means for integrating a selected modulation product over the duration of said modulation;

means for sampling the integral resulting from said integration at the end of said modulation to produce a sample with an amplitude proportional to the pseudo-autocovariance function of said signal at a delay time corresponding to the frequency of said modulating signal; and means for holding and displaying the value of said sample for a selected time.

References Cited

UNITED STATES PATENTS 3,217,251  11/1965  Andrew.

OTHER REFERENCES

Symposium on Time Series Analysis, ch. 15, pp. 209–213, Wiley & Sons (1963).

RUDOLPH V. ROLINEC, Primary Examiner

P. F. WILLE, Assistant Examiner

U.S. Cl. X.R.

179—1